United States Patent
Matsuda et al.

(10) Patent No.: US 8,974,110 B2
(45) Date of Patent: Mar. 10, 2015

(54) KNEADING DEVICE

(75) Inventors: Morihiro Matsuda, Osaka (JP);
Shinsaku Kamimura, Handa (JP)

(73) Assignee: Tsukasa Industry Co., Ltd., Handa-shi (JP)

( * ) Notice: Subject to any disclaimer, the term of this patent is extended or adjusted under 35 U.S.C. 154(b) by 1129 days.

(21) Appl. No.: 12/994,216

(22) PCT Filed: Jun. 1, 2009

(86) PCT No.: PCT/JP2009/060000
§ 371 (c)(1),
(2), (4) Date: Dec. 22, 2010

(87) PCT Pub. No.: WO2009/148023
PCT Pub. Date: Dec. 10, 2009

(65) Prior Publication Data
US 2011/0085407 A1 Apr. 14, 2011

(30) Foreign Application Priority Data
Jun. 5, 2008 (JP) .................................. 2008-148058

(51) Int. Cl.
*B01F 15/06* (2006.01)
*A21C 1/06* (2006.01)
(Continued)

(52) U.S. Cl.
CPC . *A21C 1/06* (2013.01); *A21C 1/003* (2013.01); *A21C 1/02* (2013.01); *A21C 1/146* (2013.01); *A21C 1/1495* (2013.01); *B01F 13/1027* (2013.01); *B01F 15/063* (2013.01); *B01F 7/00116* (2013.01); *B01F 7/00158* (2013.01); *B01F 7/00266* (2013.01); *B01F 2015/061* (2013.01)
USPC ........................................ 366/147; 366/155.1

(58) Field of Classification Search
CPC ...................................................... B01F 15/063
USPC .................................. 366/147, 155.1; 34/181
See application file for complete search history.

(56) References Cited

U.S. PATENT DOCUMENTS 236,677 A * 1/1881 Halsey .............................. 34/92
1,422,102 A * 7/1922 Hutchinson ................... 426/622
(Continued)

FOREIGN PATENT DOCUMENTS

JP S56-016940 Y2 4/1981
JP S59-117376 U 8/1984
(Continued)

OTHER PUBLICATIONS

International Search Report mailed on Sep. 1, 2009 for the corresponding International patent application No. PCT/JP2009/060000.
(Continued)

*Primary Examiner* — David Sorkin
(74) *Attorney, Agent, or Firm* — Posz Law Group, PLC (57) ABSTRACT

The present invention provides a kneading device 1 including a hopper 2 having a hopper body 4 that stores raw powder, and a mixer 3 that kneads material to be kneaded, which contains the raw powder, wherein the hopper 2 includes a stirring device 5 that stirs the raw powder in the hopper body, and a temperature-controlled air supply device 6 that supplies temperature-controlled air into the hopper body 4. This kneading device can stably prepare high-quality kneaded dough.

11 Claims, 5 Drawing Sheets

(51) Int. Cl.
*A21C 1/00* (2006.01)
*A21C 1/02* (2006.01)
*A21C 1/14* (2006.01)
*B01F 13/10* (2006.01)
*B01F 7/00* (2006.01)

(56) References Cited

U.S. PATENT DOCUMENTS

| | | | | |
|---|---|---|---|---|
| 1,452,871 | A | * | 4/1923 | Dienst .......................... 426/465 |
| 5,711,089 | A | * | 1/1998 | Pikus ............................ 34/267 |
| 5,806,205 | A | * | 9/1998 | Varvat ........................... 34/181 |
| 7,147,363 | B1 | * | 12/2006 | Wuest et al. ................... 366/148 |
| 2005/0083778 | A1 | * | 4/2005 | Wuest et al. ................... 366/144 |
| 2007/0171766 | A1 | | 7/2007 | Loiselet |

FOREIGN PATENT DOCUMENTS

| | | |
|---|---|---|
| JP | 63-248 A | 1/1988 |
| JP | H06-091788 B2 | 11/1994 |
| JP | H07-023688 A | 1/1995 |
| JP | H07-071441 B2 | 8/1995 |
| JP | H08-131091 A | 5/1996 |
| JP | H09-057085 A | 3/1997 |
| JP | 2002-320438 A | 11/2002 |
| KR | 20-0166774 Y1 | 2/2000 |
| KR | 10-2007-0038470 A | 4/2007 |

OTHER PUBLICATIONS

International Preliminary Report on Patentability dated Sep. 9, 2010 for the corresponding International patent application No. PCT/JP2009/060000 (English translation enclosed).

* cited by examiner

KNEADING DEVICE

This application is a U.S. national stage application of PCT/JP2009/060000 filed on Jun. 1, 2009, and claims priority to, and incorporates by reference, Japanese Patent Application No. 2008-148058 filed on Jun. 5, 2008.

TECHNICAL FIELD

The present invention relates to a kneading device.

BACKGROUND ART

Conventionally, it is necessary to mix raw materials, e.g., powders such as wheat flour, and water; and knead the mixture to form dough, when making bread, sweets, etc. A kneading device disclosed in Patent Literature 1 is known as a device that kneads a material to be kneaded.

Figure 6:
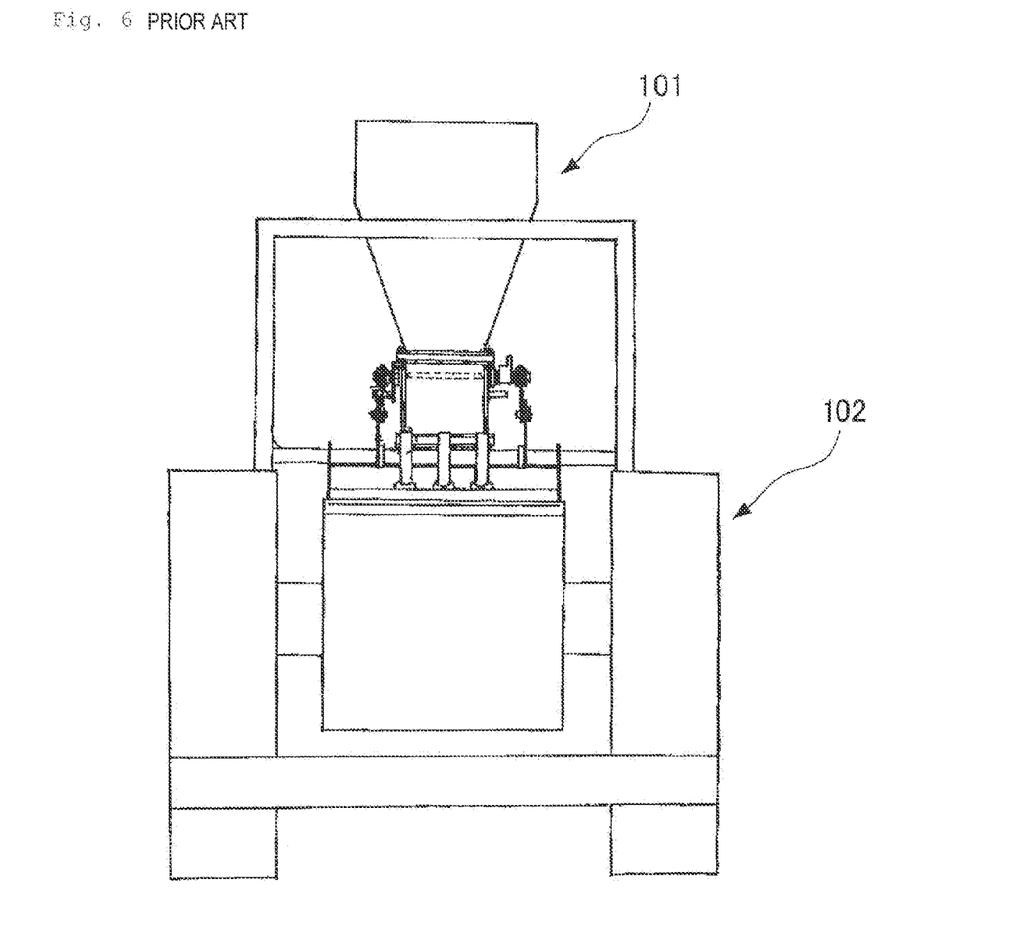
FIG. 6 is a schematic diagram showing an example of known kneading devices.

This kneading device includes, as shown in FIG. 6, a hopper 101 that stores raw powder such as wheat flour, and a mixer 102 that mixes the raw powder supplied from the hopper 101 with water for kneading, sugar, fats and/or oils, yeast, etc. to form a material to be kneaded, and kneads this material.

CITATION LIST

Patent Literature

PLT 1
Japanese Unexamined Patent Publication No. 2002-320438

SUMMARY OF INVENTION

Technical Problem

The temperature of the raw powder is an important factor in the preparation of high-quality dough of bread, sweets, etc. For example, when wheat flour is used as the raw powder, a preferable temperature range of wheat flour is considered to be 20° C. to 25° C. However, a problem arises in that the raw powder temperature cannot be maintained within the above temperature range when the above-described kneading device is used. Specifically, in summer, the temperature of the raw powder in the hopper increases to 30° C. or higher with the increase in the ambient temperature. Conversely, in winter, the raw powder temperature decreases to 20° C. or lower. It has thus been difficult to stably prepare good-quality dough.

The present invention has been accomplished to solve the above-described problem. An object thereof is to provide a kneading device capable of stably preparing high-quality kneaded dough.

Solution to Problem

The above-described object of the present invention is achieved by a kneading device including a hopper having a hopper body that stores raw powder, and a mixer that kneads a material to be kneaded, which contains the raw powder; wherein the hopper includes a stirring device that stirs the raw powder in the hopper body, and a temperature-controlled air supply device that supplies temperature-controlled air into the hopper body.

In this kneading device, the stirring device includes a rotation shaft that is substantially horizontally disposed in the hopper body, and a stirrer disposed on the rotation shaft, wherein the rotation shaft is preferably rotatable about its axis.

Further, the stirrer includes a flat surface oriented in the rotation direction, and is preferably disposed in such a manner that the normal of the flat surface is substantially perpendicular to the axis of the rotation shaft.

Still further, the hopper body includes an air supply opening through which air supplied from the temperature-controlled air supply device is guided thereinto, and an air discharge opening through which air in the hopper body is guided outside, wherein the air supply opening and the air discharge opening are preferably disposed at one end and the other end of the rotation shaft, respectively.

Additionally, the stirring device may have a structure including a rotation shaft substantially vertically disposed in the hopper body, and a stirrer disposed on the rotation shaft. In this structure, the temperature-controlled air supply device can introduce temperature-controlled air into the hopper body in a horizontal tangential direction.

The temperature-controlled air supply device may also be configured to introduce temperature-controlled air into the hopper body from a lower end of a passage formed in the rotation shaft. In this structure, the stirrer preferably includes a passage in communication with the passage in the rotation shaft, and is preferably configured to spray temperature-controlled air from a nozzle formed at a lower portion thereof.

Advantageous Effect of Invention

The present invention provides a kneading device capable of stably preparing high-quality kneaded dough.

DESCRIPTION OF EMBODIMENTS

Figure 1:
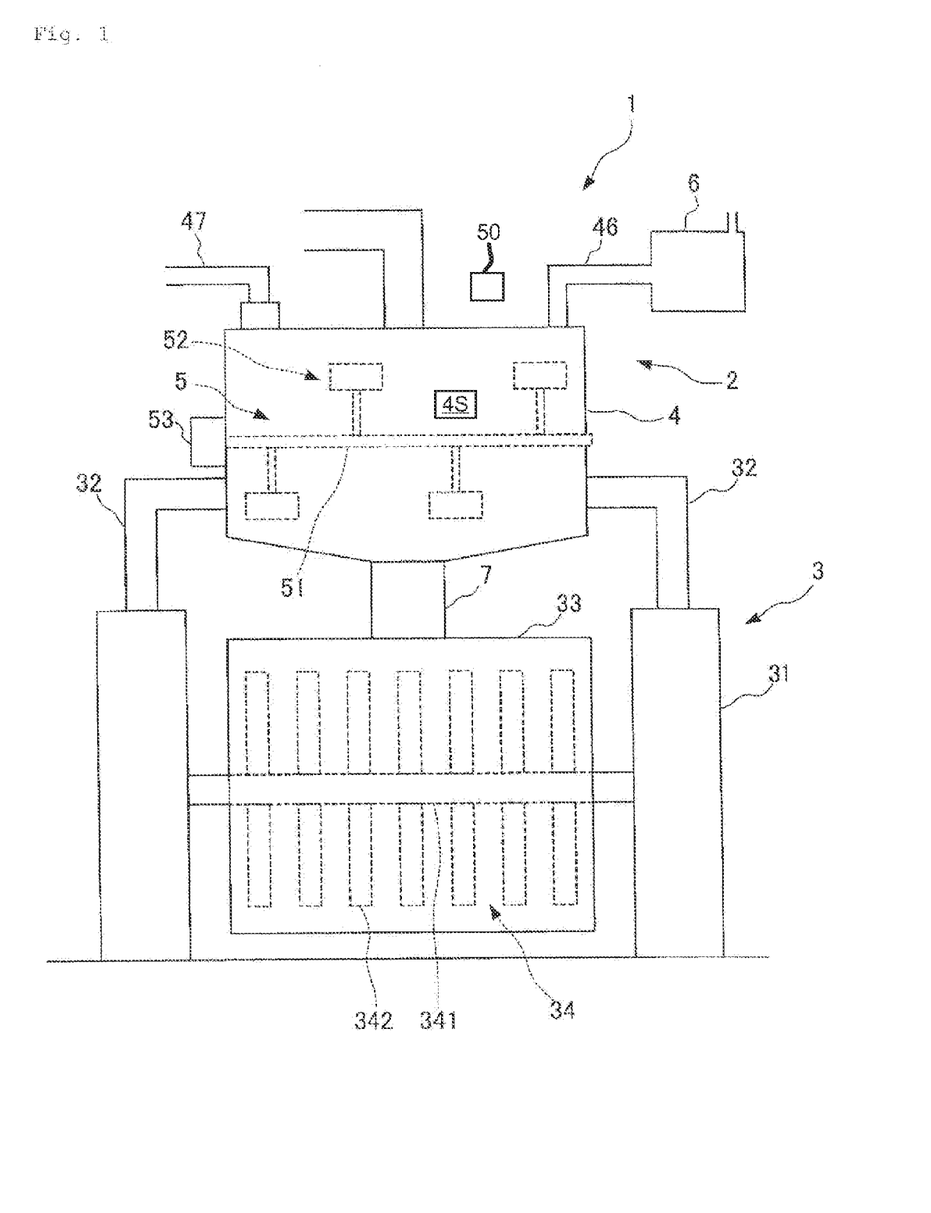
FIG. 1 is a front schematic diagram showing a kneading device according to an embodiment of the present invention.
Figure 2:
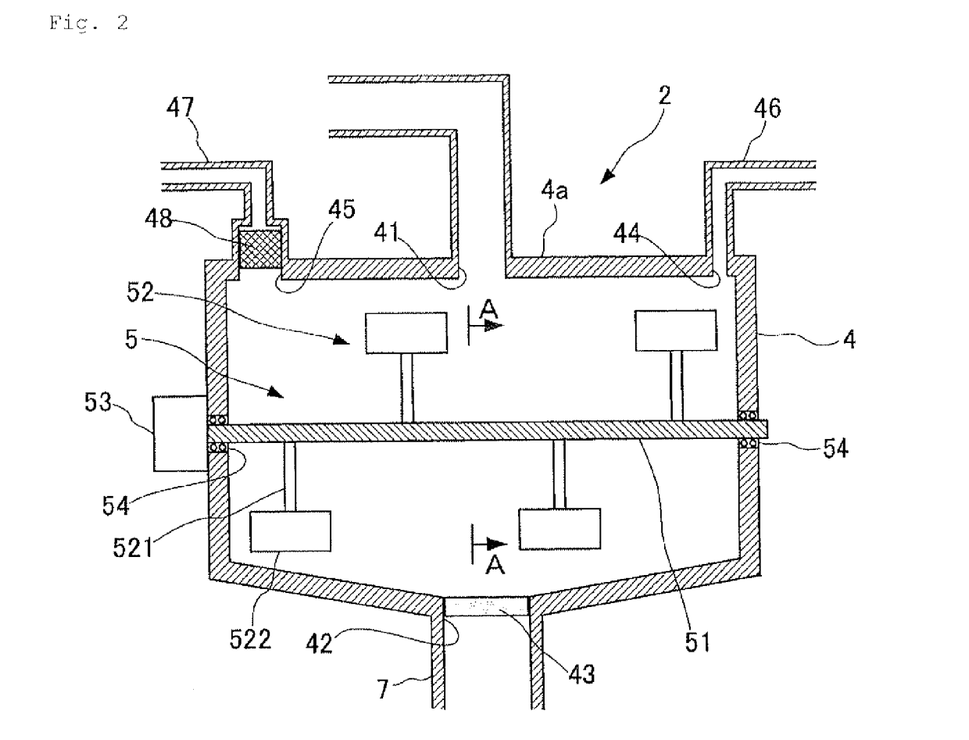
FIG. 2 is an enlarged sectional view of the main parts of the kneading device in FIG. 1.
Figure 3:
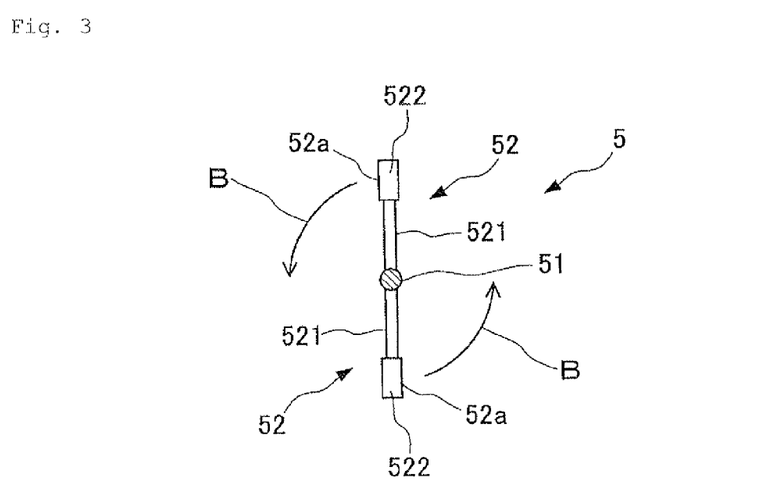
FIG. 3 is a sectional view taken along line A-A in FIG. 2.

Hereinbelow, a kneading device according to the present invention is described with reference to the attached drawings. FIG. 1 is a front schematic diagram of a kneading device 1 according to the present invention. FIG. 2 is an enlarged sectional view of the main parts thereof. FIG. 3 is a sectional view taken along line A-A in FIG. 2. As shown in FIG. 1, the kneading device 1 of the present invention includes a hopper 2, and a mixer 3 that kneads a material to be kneaded, which contains raw powder. Examples of the raw powder used herein may include conventionally known products such as wheat flour, strong flour, weak flour, barley flour, rye flour, oat flour, corn flour, etc.

As shown in FIG. 2, the hopper 2 includes a hopper body 4 that stores raw powder, a stirring device 5 that stirs the raw powder in the hopper body 4, a temperature-controlled air supply device 6 that supplies temperature-controlled air into the hopper body 4, and multiple temperature sensors (not shown) that each measure the temperature of the raw powder in the hopper body 4.

The hopper body 4 temporarily stores raw powder such as wheat flour used as an ingredient in bread and sweets, and is supported by a frame body 32 disposed on a mixer frame 31, as shown in FIG. 1. The hopper body 4 includes a raw powder entrance 41 at an upper portion thereof for introducing the raw powder guided by a conveyor (not shown) into the hopper body 4. To the raw powder entrance 41 is connected a pipe through which flows the raw powder conveyed by the conveyor. Further, a lower portion of the hopper body 4 has a shape whose diameter reduces downward, and a lower end of the lower portion forms a raw powder discharge opening 42 for discharging the stored raw powder. The raw powder discharge opening 42 has a blockage 43 such as a butterfly valve disposed thereat for closing the discharge opening 42 in a freely openable and closable manner. The raw powder stored in the hopper body 4 is conveyed to the mixer 3 when the blockage 43 opens.

As shown in FIG. 2, the stirring device 5 includes a rod-like rotation shaft 51, multiple stirrers 52 disposed on the rotation shaft 51, and a motor 53 for rotating the rotation shaft 51 about the axis. The rotation shaft 51 is substantially horizontally disposed in the hopper body 4, and both ends thereof are freely rotatably supported by bearings 54 and 54 disposed on the side wall of the hopper body 4. The rotation shaft 51 supported by the bearings 54 and 54 is preferably supported in a position in which the axis of the rotation shaft 51 is parallel to the horizon. However, the axis of the rotation shaft 51 does not always have to be parallel to the horizon. For example, the rotation shaft 51 may be supported in such a manner that the axis thereof is inclined within a range of 0° to 90° with respect to the horizon. In particular, in view of the fact that the stirrer 52 disposed on the rotation shaft 51 efficiently swirls the raw powder upward along with the rotation of the rotation shaft 51, the rotation shaft 51 is preferably supported in such a manner that the axis thereof is inclined within a range of 0° to 20° with respect to the horizon.

Each stirrer 52 is disposed with a predetermined space therebetween in the axis direction of the rotation shaft 51. Further, each stirrer 52 includes a flat surface 52*a* oriented in the rotation direction (direction indicated by arrow B in FIG. 3), and is disposed in such a manner that the normal of the flat surface 52*a* is substantially perpendicular to the axis of the rotation shaft 51. The structure of the stirrer 52 is described in further detail below. The stirrer 52 includes a rod-like shaft portion 521 and blade portions 522 each disposed at an end of the shaft portion 521. The shaft portion 521 is attached to the rotation shaft 51 so as to be perpendicular to the axis of the rotation shaft 51. Each blade portion 522 has a flat plate shape, and one side thereof oriented in the rotation direction of the rotation shaft 51 forms the flat surface 52*a*. The blade portion 522 is attached to the shaft portion 521 in such a manner that the normal of the flat surface 52*a* is substantially perpendicular to the axis of the rotation shaft 51. The motor 53 is connected to one end of the rotation shaft 51, and rotates the rotation shaft 51 about its axis by receiving a supply of power.

Further, the hopper body 4 has an air supply opening 44 and an air discharge opening 45, which communicate with the inside and outside of the hopper body 4. In the present embodiment, the air supply opening 44 and the air discharge opening 45 are formed in a top surface 4*a* of the hopper body 4. Further, the air supply opening 44 is disposed above one end of the rotation shaft 51. The air discharge opening 45 is disposed above another end of the rotation shaft 51. To the air supply opening 44 is connected a conveying pipe 46 of the temperature-controlled air supply device 6 (described below). To the air discharge opening 45 is connected an air discharge pipe 47 for guiding the temperature-controlled air supplied from the temperature-controlled air supply device 6 (described below) outside. A pump (not shown) for discharging air in the hopper body 4 outside is disposed midway through the air discharge pipe 47. Further, a filter member 48 such as a bag filter is disposed in the air discharge opening 45. The filter member 48 prevents the raw powder stored in the hopper body 4 from being discharged outside along with the airflow.

The temperature-controlled air supply device 6 is a device that takes in outside air, controls the temperature thereof to a predetermined temperature, and discharges the air. A hot-air generator, a cold-air generator, and the like are examples of the device. The temperature-controlled air supply device 6 includes a temperature sensor that measures the temperature of temperature-controlled discharge air, and a controller 50 for setting the temperature of the temperature-controlled air. Further, in order to supply air whose temperature is controlled to a predetermined temperature into the hopper body 4, the conveying pipe 46 in communication with the air supply opening 44 formed in the hopper body 4 is connected to the temperature controlled air supply device 6.

Each of the multiple temperature sensors 4S that measure the temperature of the raw powder in the hopper body 4 is a sensor such as a thermocouple, and is disposed at a position where the temperature sensor is buried in the raw powder when the raw powder is stored in the hopper body 4, and where the temperature sensor does not interfere with each member constituting the stirring device 5. The temperatures measured by these multiple temperature sensors are averaged out, and the average temperature is indicated, for example, on a display unit 30 (not shown) disposed at an outer surface of the hopper body 4

The mixer 3 is disposed below the hopper 2, and includes a mixing drum 33 that stores raw powder supplied from the hopper 2, and a kneading and stirring device 34 disposed in the inner space of the mixing drum 33. The mixing drum 33 has an opening formed in the top. This opening is connected to a raw powder supply passage 7 disposed at the raw powder discharge opening 42 formed at the lower end of the hopper body 4. Additionally, the mixing drum 33 has a kneaded material-removal opening (not shown) formed at a lower portion, from which a kneaded material can be removed. Note that the mixing drum 33 is provided with an opening (not shown) for mixing the raw powder with various ingredients such as water for kneading, which is led from a water supply device (not shown), butter, shortening, margarine, other fats and/or oils, eggs, baking powder, etc. It is preferable that table sugar, maltose, lactose, and other sugars, salt, yeast, and the like are dissolved in advance in the water for kneading that is supplied from the water supply device. The kneading and stirring device 34 is a device that kneads a material to be kneaded, which is a mixture of raw powder, water, and the like; and prepares dough of bread, sweets, and the like. The kneading and stirring device 34 includes a kneading and stirring shaft 341 substantially horizontally disposed in the mixing drum 33, and multiple kneading and stirring blades 342 disposed on the kneading and stirring shaft 341. Both ends of the kneading and stirring shaft 341 are freely rotatably supported by bearings provided in the mixer frame. Further, a motor is attached to one end of the kneading and stirring shaft 341, and the kneading and stirring shaft 341 can be rotated by driving of the motor.

Next, the operation of the kneading device 1 according to the present embodiment is described. First, the blockage 43 such as a butterfly valve disposed at the raw powder discharge opening 42 at the lower end of the hopper body 4 is closed. While maintaining the closed state, a predetermined amount of raw powder is supplied by the conveyor (not shown) into the hopper body 4. The volume of the raw powder supplied into the hopper body 4 is preferably about 70% to 80% of the internal volume of the hopper body 4. This is to allow efficient heat exchange between the raw powder and the temperature-controlled air supplied from the temperature-controlled air supply device 6 by swirling the raw powder upward during stirring of the raw powder by the stirring device 5.

After stopping the supply of raw powder into the hopper body 4, the motor 53 of the stirring device 5 is driven to rotate the rotation shaft 51 about the shaft axis. Additionally, the temperature-controlled air supply device 6 is driven to supply temperature-controlled air whose temperature is controlled to a predetermined temperature into the hopper body 4. The rotation of the rotation shaft 51 rotates the stirrer 52 in the hopper body 4, and stirs the raw powder stored therein. During stirring, the blade portions 522 swirl the raw powder upward in the hopper body 4. The swirled-upward raw powder exchanges heat with the temperature-controlled air supplied from the temperature-controlled air supply device 6. The raw powder in the hopper body 4 is uniformly heated or cooled by continuously stirring the raw powder by the stirring device 5 as well as supplying temperature-controlled air from the temperature-controlled air supply device 6.

Further, after finishing heat exchange with the raw powder, the air supplied from the temperature-controlled air supply device 6 is discharged outside via the air discharge opening 45 formed in the hopper body 4. At this time, a portion of the raw powder stored in the hopper body 4 is guided to the air discharge opening 45 along with the air flow. However, because the filter member 48 such as a bag filter is disposed in the air discharge opening 45, a situation where the raw powder is discharged outside is prevented. Because the raw powder filtered by the filter member 48 drops under its own weight, the filter member 48 is prevented from being completely clogged. To more reliably prevent clogging of the filter member 48, for example, a bag filter provided with an automatic cleaning device may be used to shake off the raw powder attached to and accumulated on the filter member by reverse-cleaning, accomplished by pulse-jet (pressure air) and the like.

After all of the raw powder uniformly reaches a predetermined temperature (for example, a temperature in the range of 20° C. to 25° C. when the raw powder is wheat flour), the blockage 43 disposed in the raw powder discharge opening 42 at the lower end of the hopper body 4 is opened, thereby guiding the raw powder that has been heated or cooled to a predetermined temperature to the mixer 3. At this time, the raw powder stored in the hopper body 4 is automatically supplied into the mixing drum 33 under its own weight. The raw powder can be supplied at a faster rate because the raw powder is fluidized by the driving of the stirring device 5, and the raw powder is forcibly expelled by the stirring device 5 toward the mixer 3 from the raw powder discharge opening 42.

When the supply of the raw powder to the mixing drum 33 is finished, the hopper body 4 again stores the next batch of raw powder conveyed via the conveyor (not shown), and the stirring device 5 and the temperature-controlled air supply device 6 are driven. Thereby, the raw powder to be kneaded next by the mixer 3 can be heated or cooled to a predetermined temperature while the temperature-controlled raw powder is kneaded in the mixer 3. Thus, the control of the temperature of the raw powder can be efficiently performed, resulting in an increase in the efficiency of kneading work.

In the mixer 3, a material to be kneaded, which contains raw powder, is formed by supplying predetermined amounts of water for kneading, specific sugars, fats and/or oils, yeast, etc. into the mixing drum 33; afterward, the kneading and stirring device 34 is driven. The kneading and stirring device 34 is driven for a predetermined period of time to knead the material to be kneaded, thereby preparing dough of bread and sweets. After kneading is finished, the kneading and stirring device 34 is deactivated, and the prepared dough is removed through the kneaded material-removal opening (not shown). The dough is then subjected to a subsequent forming process.

With the kneading device 1 of the present embodiment, the raw powder temperature can be maintained at a temperature suitable for preparing dough of bread, sweets, and the like because the hopper 2 has the stirring device 5 and the temperature-controlled air supply device 6, and the raw powder immediately before being kneaded by the mixer 3 can be heated or cooled to uniformly reach a predetermined temperature (for example, a temperature range of 20° C. to 25° C. when wheat flour is used as the raw powder). As a result, it is possible to stably prepare high-quality dough.

Further, because the stirring device 5 includes the rotation shaft 51 and the stirrer 52 disposed on the rotation shaft 51, raw powder that is stored in the hopper body 4 can be efficiently swirled upward. This allows efficient heat exchange between the raw powder and the temperature-controlled air supplied from the temperature-controlled air supply device 6, as well as a reduction in time for the temperature of the raw powder in the hopper body 4 to reach a predetermined temperature.

Further, in the kneading device 1 of the present embodiment, the stirrer 52 includes the flat surface 52a oriented in the rotation direction, in which the normal of the flat surface 52a is disposed substantially perpendicular to the axis of the rotation shaft 51. Accordingly, the stirrer 52 can further efficiently swirl raw powder upward along with the rotation of the rotation shaft 51. As a result, the raw powder can be efficiently brought into contact with the temperature-controlled air supplied from the temperature-controlled air supply device 6, and thus heat exchange between the temperature-controlled air and the raw powder can be efficiently carried out.

Further, because the air supply opening 44 and the air discharge opening 45 formed in the hopper body 4 are disposed at one side and the other side of the rotation shaft 51, respectively, the distance in which temperature-controlled air passes through the hopper body 4 is substantially equal to the length of the rotation shaft 51 in the hopper body 4. Thereby, the time of heat exchange between the raw powder swirled upward by the stirring device 5 and the temperature-controlled air can be increased, allowing further efficient heating or cooling of the raw powder. However, the arrangement of the air supply opening 44 is not limited to that in the present embodiment. For example, the air supply opening 44 may be disposed below the hopper body 4, and configured to blow temperature-controlled air into the raw powder that is stored. Additionally, more than one air supply opening 44 may be disposed, for example, at both the left and right sides of the hopper body 4 shown in FIG. 1.

Further, with the kneading device 1 of the present embodiment, when, for example, a mixture of strong flour, weak flour, and the like is used as the raw powder, the mixture (raw powder) can be stirred by the stirring device 5 before being kneaded by the mixer 3. Therefore, the mixture of strong flour, weak flour, and the like can be uniformly mixed, and the quality of the product can be stably maintained.

The kneading device 1 of the present embodiment is disposed in such a manner that the rotation shaft 51 of the stirring device 5 extends in a substantially horizontal direction, and the stirrers 52 can stir the raw powder by pushing the raw powder from below to above. Accordingly, stirring can be favorably performed, even at low-speed rotation. Therefore, when the raw powder is granulated in the kneading device 1, kneading can be performed without destroying the granular structure.

Figure 4:
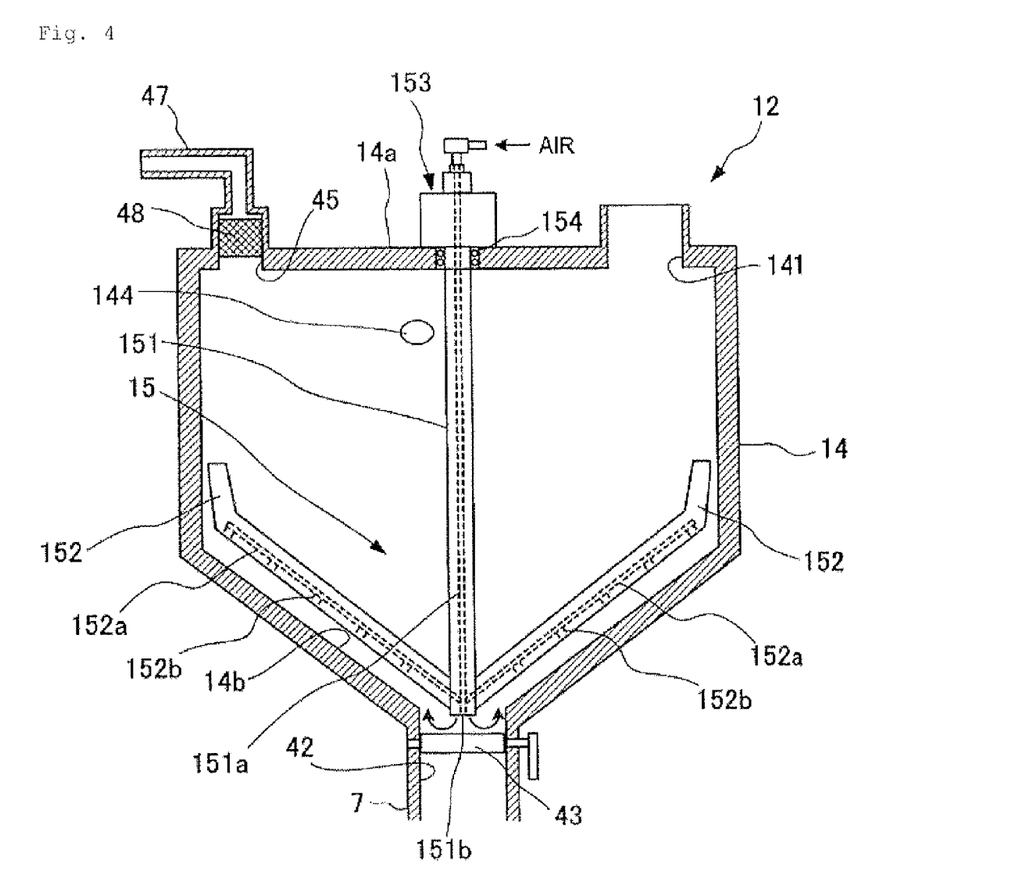
FIG. 4 is an enlarged sectional view of the main parts of a kneading device according to another embodiment of the present invention.
Figure 5:
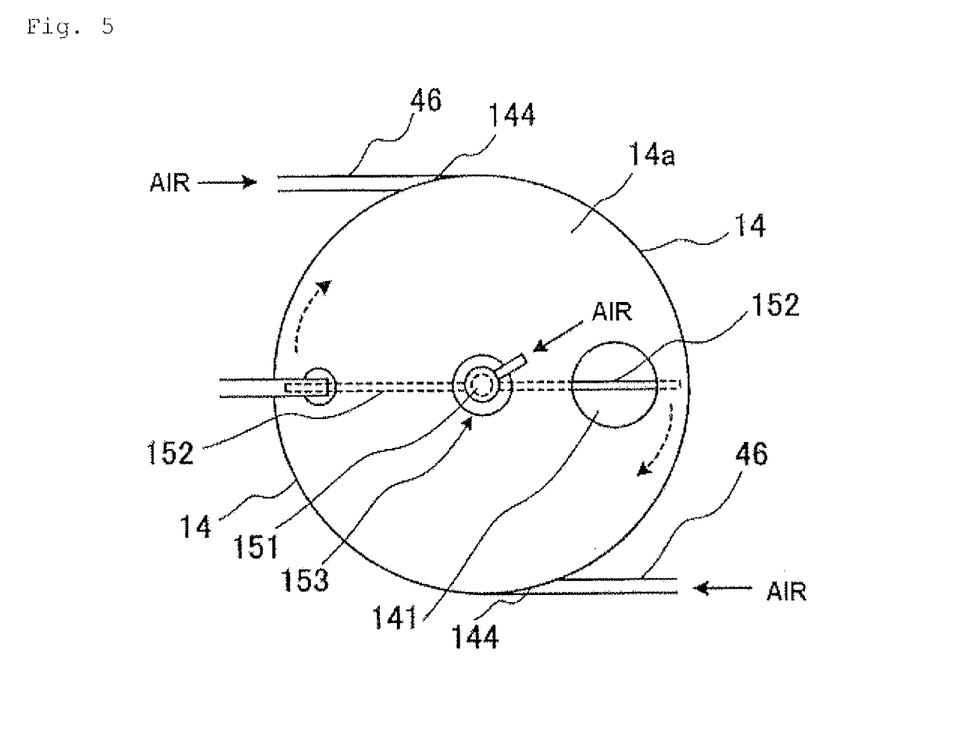
FIG. 5 is a plan view of the structure shown in FIG. 4.

Conversely, the rotation shaft of the stirring device can also be disposed so as to extend in a substantially vertical direction. FIGS. 4 and 5 show a sectional view and a plan view, respectively, of a modified embodiment of the hopper 2 shown in FIG. 2. In FIGS. 4 and 5, the same components as those in FIG. 2 are denoted by the same reference signs.

A hopper 12 includes a stirring device 15, and the stirring device 15 includes a rod-like rotation shaft 151 and multiple stirrers 152 disposed on the rotation shaft 151. The rotation shaft 151 is disposed so as to vertically extend through a top surface 14*a* of a hopper body 14, and an upper portion thereof is freely rotatably supported by bearings 154. The rotation shaft 151 has a passage 151*a* formed inside thereof, through which compressed air supplied from the temperature-controlled air supply device 6 (see FIG. 1) passes. The rotation shaft 151 is configured in such a manner that the temperature-controlled air supplied from an upper end of the rotation shaft 151 can be sprayed from a lower end thereof into the hopper body 14. A single rotary joint 153 is attached to the rotation shaft 151, specifically at a portion projecting from the top surface 14*a* of the hopper body 14, and temperature-controlled air can be supplied to the rotation shaft 151 being rotated. The rotary driving force can be directly transmitted to the rotation shaft 151 from an orthogonal hollow-shaft driving motor, or can be transmitted to the rotation shaft 151 from a general driving motor via a pulley and a pulley belt (neither is shown).

Two stirrers 152 are respectively disposed on both sides of the rotation shaft 151, and a slight space is formed between the stirrers 152 and inclined surfaces 14*b* formed at a lower portion of the hopper body 14. The number and shape of the stirrers 152 are not particularly limited.

The hopper body 14 has an air supply opening 144 formed at a side wall thereof, for introducing temperature-controlled air from the temperature-controlled air supply device 6 (see FIG. 1) via the conveying pipe 46. In the present embodiment, the air supply opening 144 is formed at two portions with the rotation shaft 151 therebetween so as to introduce temperature-controlled air into the hopper body 14 in a horizontal tangential direction.

It is also possible, with the kneading device having the thus-configured hopper 12, to supply a predetermined amount of raw powder (for example, about 70% to 80% of the internal volume of the hopper body 14) from a raw powder entrance 141 into the hopper body 14, and subsequently drive the stirring device 15 and the temperature-controlled air supply device 6, while maintaining a closed state of the blockage 43 such as a butterfly valve disposed in the raw powder discharge opening 42 at the lower end of the hopper body 14. The raw powder stored in the hopper body 14 is stirred around the rotation shaft 151 extending in a vertical direction, and the temperature-controlled air introduced from the air supply openings 144 forms a swirling flow in the hopper body 14 and exchanges heat with the raw powder. Accordingly, stirring of the raw powder and control of the temperature can be carried out in a favorable manner. Further, the temperature-controlled air sprayed from a lower end portion 151*b* of the rotation shaft 151 is blown into the raw powder. This also helps stirring of the raw powder and control of the temperature to be carried out in a favorable manner. The temperature-controlled air introduced into the hopper body 14 is discharged from the air discharge opening 45 formed in the top surface of the hopper body 14 via the filter member 48.

In the stirring device 15 of the present embodiment, the rotation shaft 151 rotates clockwise, as shown by the dashed line arrows in FIG. 5, thereby matching the swirling direction of the temperature-controlled air introduced from the air supply openings 144 in the stirring direction. Note that the temperature of the raw powder can also be uniformly controlled by rotating the rotation shaft 151 of the stirring device 15 counterclockwise to stir the raw powder in a direction opposite the swirling direction of the temperature-controlled air.

The present embodiment is configured to introduce temperature-controlled air into the hopper body 14 not only from the air supply openings 144 but also from the lower end portion 151*b* of the rotation shaft 151; however, the temperature-controlled air may be introduced from only one of them. Further, the temperature-controlled air introduced from the air discharge opening 45 does not always have to form a swirling flow in the hopper body 14. For example, it is possible to form a plurality of equally spaced air discharge openings that open from the sidewall of the hopper body 14 toward the center in a peripheral direction of the hopper body 14 so as to introduce temperature-controlled air in a radial direction. The height position of the air discharge opening 45 in the hopper body 14 is not particularly limited. It is also possible to form multiple stages of the air discharge opening 45 in a vertical direction.

In the present embodiment, as shown in FIG. 4, each stirrer 152 has passages 152*a* formed inside thereof, which communicate with the passage 151*a* of the rotation shaft 151; and temperature-controlled air is sprayed toward the inclined surfaces 14*b* from multiple nozzles 152*b* formed at a lower portion of each stirrer 152. Stirring of the raw powder and control of the temperature can be carried out in a favorable manner because of the above-described configuration. The present embodiment is configured to introduce temperature-controlled air into the hopper body 14 from the air supply openings 144, the lower end portion 151*b* of the rotation shaft 151, and each nozzle 152*b* of the stirrers 152. However, the configuration may be such that temperature-controlled air is introduced from only one of the above-described portions.

REFERENCE SIGNS LIST

1 Kneading device
2 Hopper
3 Mixer
4 Hopper body
5 Stirring device
51 Stirrer
53 Motor
6 Temperature-controlled air supply device

The invention claimed is:

1. A kneading and dough-making device comprising:
a hopper having a hopper body storing a raw powder and being configured to maintain the raw powder at a predetermined temperature, a stirring device stirring the raw powder in the hopper body, a temperature sensor measuring a temperature of the raw powder in the hopper body, an air supply opening guiding air into the hopper body and an air discharge opening guiding air contained within the hopper body to a location outside the hopper body, the air discharge opening being arranged in a top surface of the hopper body and including a filter member;

a temperature-controlled air supply device supplying temperature-controlled air into the hopper body through the air supply opening of the hopper body and maintaining the raw powder at a predetermined temperature, the temperature-controlled air supply device including a temperature sensor measuring the temperature of temperature-controlled air supplied to the hopper body; and and a mixer receiving the raw powder at the predetermined temperature from the hopper and kneading the received raw powder to make dough.

2. The kneading and dough-making device according to claim 1, wherein the stirring device comprises a rotation shaft substantially horizontally disposed in the hopper body, and a stirrer disposed on the rotation shaft; and the rotation shaft is configured to be rotatable about its axis.

3. The kneading and dough-making device according to claim 2, wherein the stirrer comprises a flat surface oriented in a rotation direction, and is disposed in such a manner that the normal of the flat surface is substantially perpendicular to the axis of the rotation shaft.

4. The kneading and dough-making device according to claim 2, wherein the stirring device comprises a rotation shaft substantially horizontally disposed in the hopper body, and a stirrer disposed on the rotation shaft;

the rotation shaft is configured to be rotatable about its axis; and the air supply opening and the air discharge opening are disposed at one end and the other end of the rotation shaft, respectively.

5. The kneading and dough-making device according to claim 1, wherein the stirring device comprises a rotation shaft substantially vertically disposed in the hopper body, and a stirrer disposed on the rotation shaft.

6. The kneading and dough-making device according to claim 5, wherein the temperature-controlled air supply device introduces temperature-controlled air into the hopper body in a horizontal tangential direction.

7. The kneading and dough-making device according to claim 5, wherein the temperature-controlled air supply device introduces temperature-controlled air into the hopper body from a lower end of a passage formed in the rotation shaft.

8. The kneading and dough-making device according to claim 7, wherein the stirrer comprises a passage in communication with the passage of the rotation shaft, and is configured to spray temperature-controlled air from a nozzle formed at a lower portion thereof.

9. The kneading and dough-making device according to claim 1, wherein the air supply opening and the air discharge opening are disposed at one end and the other end of the hopper body.

10. The kneading and dough-making device according to claim 1, wherein the stirring device is configured to swirl the raw powder into the temperature-controlled air supplied from the temperature-controlled air supply device causing the raw powder to exchange heat with the temperature-controlled air supplied from the temperature-controlled air supply device.

11. The kneading and dough-making device according to claim 1, further comprising a controller configured to control the temperature-controlled air supplied to the hopper body and to maintain the raw powder at the predetermined temperature in the hopper body.

\* \* \* \* \*